(Model.)
J. L. FIRM.
PLATE RACK FOR STEREOTYPE BLOCKS.
No. 283,876. Patented Aug. 28, 1883.
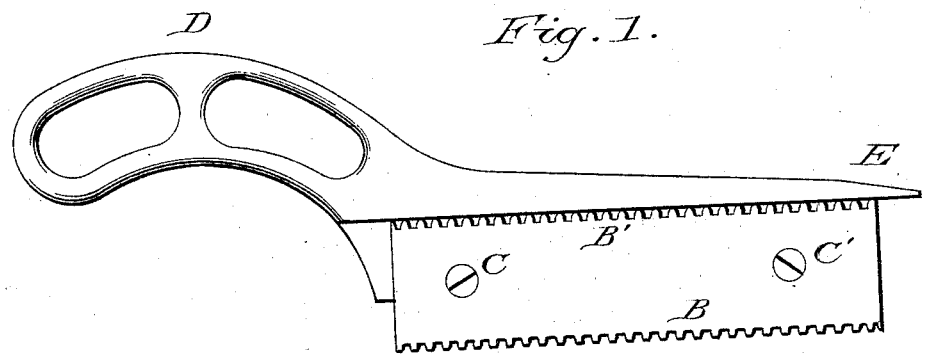
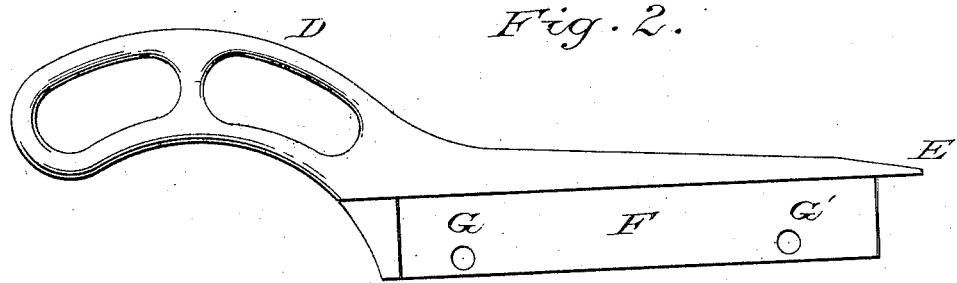
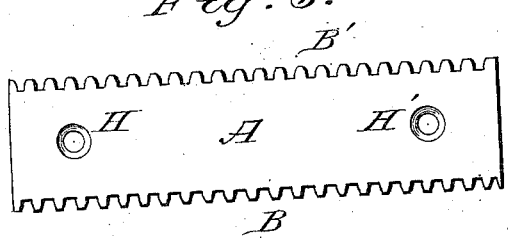
Witnesses:
Alexander Sutherland
James Gilmer Jr
Inventor:
Joseph L. Firm

UNITED STATES PATENT OFFICE.

JOSEPH L. FIRM, OF JERSEY CITY, NEW JERSEY.

PLATE-RACK FOR STEREOTYPE-BLOCKS.

SPECIFICATION forming part of Letters Patent No. 283,876, dated August 28, 1883.

Application filed June 14, 1881. (Model.)

*To all whom it may concern:*

Be it known that I, JOSEPH L. FIRM, of Jersey City, in the county of Hudson, in the State of New Jersey, have invented certain new and useful Improvements in Plate-Racks for Stereotype-Blocks, of which the following is a full, clear, and exact description, reference being had to the accompanying drawings, forming part hereof.

The object of my invention is to produce a plate-rack for printers' use to engage with a plate-holding block, so that the blade can be reversed and removed for filing or changing, when necessary, without injuring or impairing the usefulness of the handle.

Heretofore handles of plate-racks have been made of wood, with a groove in which the blade is held, such blade having teeth on but one side or edge, and being riveted to the handle, so that a blade could not be removed for filing or a new one substituted therefor without so materially defacing the handle as to render it useless.

My invention consists of a plate-rack for use in fastening stereotype-blocks, composed of a metallic handle and a blade so attached thereto, as by screws, as to be easily removable and replaceable for filing or repairing without defacing or injuring the handle; and the invention also consists in providing the blade of such a plate-rack with teeth on both of its longitudinal edges, whereby as one edge is dulled the blade may be reversed, and a fresh edge thus presented.

In the accompanying drawings, in the several figures of which like parts are similarly designated, Figure 1 is a front elevation of my device. Fig. 2 is a similar view of the handle, the blade being removed; and Fig. 3 is a side view of the reversible blade detached.

Blocks for holding plates on printing-presses are furnished with a toothed wheel for drawing a hook against the plates to hold them firmly in place. As a convenient means for operating these wheels, toothed racks have been provided, and my improvements in such racks consist in making the handle D of metal, rabbeted at F, and provided with screw-threaded holes G G' to receive the blade A, and screws C C' for fastening the blade removably to said handle. By this construction of the blade and handle said blade may be removed and replaced at pleasure without defacing or injuring the handle. The holes H H' in the blade A, for the passage of the screws into the handle, are preferably countersunk. The handle D may have an edged point, E, which will serve as a screw-driver for lifting the plates from the blocks, or screwing plates to blocks when the catches do not hold the plates.

The blade A of my improvements has teeth B B' on both of its longitudinal edges, and the screw-holes H and H' are so arranged in the blade as that the blade may be reversed at pleasure to bring either of its edges into position for use.

It is obvious that this invention may be embodied in various forms without departing from the gist or spirit thereof.

Having thus described my invention, what I claim is—

1. A plate-rack for stereotype-blocks and the like, provided with a blade toothed on opposite edges and removably attached to its handle, substantially as specified.

2. As an improved article of manufacture, a plate-rack for stereotype-blocks, composed of the handle D, having the screw-driving point E, the blade A, toothed on its opposite edges, and means, substantially as described, to removably secure said blade to said handle, to permit the reversal of the blade therein to bring either edge into position for use, substantially as specified.

3. The metallic handle D, rabbeted at F, and provided with screw-threaded holes G G', combined with a toothed blade, A, and screws C C', substantially as shown and described.

JOSEPH L. FIRM. [L. S.]

Witnesses:
GEORGE D. MORRIS,
JOHN HOLLING.